(12) United States Patent
Barton et al.

(10) Patent No.: US 10,690,059 B2
(45) Date of Patent: Jun. 23, 2020

(54) ADVANCED SEALS WITH REDUCED CORNER LEAKAGE

(71) Applicant: General Electric Company, Schenectady, NY (US)

(72) Inventors: Jesse Ellis Barton, Fountain Inn, SC (US); Richard Martin DiCintio, Simpsonville, SC (US); Elizabeth Angelyn Monaghan, Greenville, SC (US)

(73) Assignee: General Electric Company, Schenectady, NY (US)

(*) Notice: Subject to any disclaimer, the term of this patent is extended or adjusted under 35 U.S.C. 154(b) by 842 days.

(21) Appl. No.: 15/275,575

(22) Filed: Sep. 26, 2016

(65) Prior Publication Data

US 2018/0087457 A1    Mar. 29, 2018

(51) Int. Cl.
| | | |
|---|---|---|
| *F02C 7/28* | (2006.01) | |
| *F16J 15/16* | (2006.01) | |
| *F01D 9/02* | (2006.01) | |
| *F01D 9/04* | (2006.01) | |
| *F02C 3/04* | (2006.01) | |

(52) U.S. Cl.
CPC ............... *F02C 7/28* (2013.01); *F01D 9/023* (2013.01); *F01D 9/04* (2013.01); *F02C 3/04* (2013.01); *F16J 15/16* (2013.01); *F05D 2220/32* (2013.01)

(58) Field of Classification Search
CPC .... F02C 3/04; F02C 7/28; F01D 9/023; F01D 9/04; F01D 11/005; F16J 15/00; F16J 15/02; F16J 15/16; F05D 2220/32; F05D 2240/128; F05D 2240/35

USPC .......................................................... 60/805
See application file for complete search history.

(56) References Cited

U.S. PATENT DOCUMENTS

| | | | |
|---|---|---|---|
| 5,265,412 | A | 11/1993 | Bagepalli et al. |
| 5,987,879 | A | 11/1999 | Ono |
| 6,450,762 | B1 | 9/2002 | Munshi |
| 6,547,257 | B2 | 4/2003 | Cromer |
| 6,588,214 | B2 | 7/2003 | Mack et al. |
| 6,834,507 | B2 | 12/2004 | Jorgensen |

(Continued)

FOREIGN PATENT DOCUMENTS

| | | |
|---|---|---|
| EP | 3 048 258 A1 | 7/2016 |
| EP | 3 249 164 A1 | 11/2017 |

(Continued)

OTHER PUBLICATIONS

Extended European Search Report and Opinion issued in connection with corresponding EP Application No. 17191919.4 dated Jan. 26, 2018.

*Primary Examiner* — Mark A Laurenzi
*Assistant Examiner* — Loren C Edwards
(74) *Attorney, Agent, or Firm* — Dority & Manning, P.A.

(57) ABSTRACT

A gas turbine includes a plurality of combustors and a turbine with a sealing arrangement between aft frames of the combustors and a first stage nozzle of the turbine. The sealing arrangement includes first and second circumferential outer seals with a radial side seal therebetween, the outer seals include circumferential extensions with an installation clearance, and the side seal includes a leaf that obstructs the installation clearance. The sealing arrangement also includes a notch on the side seal that forms a sliding joint with extensions of the first and second outer seals.

17 Claims, 7 Drawing Sheets

(56) References Cited

U.S. PATENT DOCUMENTS

| | | |
|---|---|---|
| 7,481,037 B2 | 1/2009 | Takaya et al. |
| 7,784,264 B2 | 8/2010 | Weaver et al. |
| 7,797,948 B2 | 9/2010 | Weaver et al. |
| 7,908,866 B2 | 3/2011 | Kato et al. |
| 8,141,879 B2 | 3/2012 | Venkataraman et al. |
| 8,225,614 B2 * | 7/2012 | Lacy .............. F01D 9/023 60/752 |
| 8,562,000 B2 | 10/2013 | Moehrle et al. |
| 8,661,828 B2 | 3/2014 | Pieussergues et al. |
| 8,985,592 B2 | 3/2015 | Green et al. |
| 9,115,585 B2 | 8/2015 | Melton et al. |
| 2004/0031271 A1 | 2/2004 | Jorgensen |
| 2004/0154303 A1 | 8/2004 | Mitchell et al. |
| 2006/0123797 A1 | 6/2006 | Zborovsky et al. |
| 2006/0127219 A1 | 6/2006 | Zborovsky |
| 2008/0053107 A1 | 3/2008 | Weaver et al. |
| 2009/0322036 A1 | 12/2009 | Halling |
| 2011/0020113 A1 | 1/2011 | Beeck |
| 2011/0304104 A1 | 12/2011 | McMahan et al. |
| 2012/0085103 A1 | 4/2012 | Lacy et al. |
| 2012/0200046 A1 | 8/2012 | Green et al. |
| 2012/0280460 A1 | 11/2012 | Cihlar et al. |
| 2013/0161914 A1 | 6/2013 | Sarawate et al. |
| 2015/0184528 A1 | 7/2015 | Belsom |
| 2017/0342850 A1 | 11/2017 | Morgan et al. |
| 2018/0058331 A1 | 3/2018 | Barton et al. |

FOREIGN PATENT DOCUMENTS

| | | |
|---|---|---|
| FR | 2 422 037 A1 | 11/1979 |
| WO | 2016/036382 A1 | 3/2016 |

* cited by examiner

ADVANCED SEALS WITH REDUCED CORNER LEAKAGE

FIELD OF THE TECHNOLOGY

The subject matter disclosed herein relates to a combustor for a gas turbine. More specifically, the disclosure is directed to a sealing arrangement for the interface of one or more combustor transition ducts with one or more inlets of a first stage nozzle of a gas turbine.

BACKGROUND

Gas turbines typically comprise several interconnected discrete parts. A gas turbine generally includes an inlet section, a compression section, a plurality of combustors, a turbine section, and an exhaust section. The inlet section may include a series of filters, cooling coils, moisture separators, and/or other devices to purify and otherwise condition a working fluid (e.g., air) entering the gas turbine. The working fluid flows downstream from the inlet section to a compressor section where kinetic energy is progressively imparted to the working fluid to produce a compressed working fluid at a highly energized state. The compressed working fluid is mixed with a fuel from a fuel supply to form a combustible mixture within one or more combustors. The combustible mixture is burned to produce combustion gases having a high temperature and pressure. The combustion gases flow through a turbine of a turbine section wherein energy (kinetic and/or thermal) is transferred from the combustion gases to rotor blades, thus causing a shaft to rotate and produce work. For example, the rotation of the turbine shaft may drive the compressor to produce the compressed working fluid. Alternately or in addition, the shaft may connect the turbine to a generator for producing electricity. Exhaust gases from the turbine flow through an exhaust section that connects the turbine to an exhaust stack downstream from the turbine. The exhaust section may include, for example, a heat recovery steam generator for cleaning and extracting additional heat from the exhaust gases prior to release to the environment.

The combustors of a gas turbine are generally connected to the inlets of a first stage nozzle of the turbine section via transition ducts. Typically, each transition duct has an aft frame downstream of the combustor which connects to an inlet of the turbine section. The aft frame will usually have two arcuate portions which are typically referred to as inner and outer portions, being inner and outer in the radial direction with respect to the centerline axis of the turbine. The inner and outer portions of the aft frame are interconnected by radially extending linear portions, often referred to as side portions. Inner and outer circumferential seals are used to seal between the inner and outer portions of the aft frame and the corresponding inlet of the turbine section. Radially oriented side seals can be disposed between adjacent aft frames to substantially close and seal off the circumferential gaps between the side portion of one aft frame and the next aft frame.

The radially oriented side seals between circumferentially adjacent aft frames are axially offset (with reference to the turbine axis) from the inner and outer seals between each aft frame and the inlet. Because of this axial offset, gaps remain between the inner and outer seals and the side seals. Gas turbines usually burn hydrocarbon fuels and produce air polluting emissions such as oxides of nitrogen (NOx) and carbon monoxide (CO). Thus, gaps between the inner and outer seals and the side seals may lead to escape of working fluid (e.g., compressed air and/or combustion gases) flowing through the transition duct from the combustor to the first stage nozzle, which can cause lower performance and a shift in the emission of air pollutants.

BRIEF DESCRIPTION OF THE TECHNOLOGY

Aspects and advantages are set forth below in the following description, or may be obvious from the description, or may be learned through practice.

Improved sealing connections between the various parts of the gas turbine are desired in the art. In particular, gas turbines and associated sealing arrangements which facilitate a reduction or elimination of compressed air bypassing the combustor, working fluid lost to the ambient atmosphere, and/or emissions escaping to the ambient atmosphere would be advantageous.

One embodiment of the present disclosure is directed to a sealing arrangement for sealing between a first component and a second component. The sealing arrangement includes a first outer seal comprising a main body, a circumferentially oriented frame rail, an axially oriented leaf, a frame rail extension that extends circumferentially beyond the main body, and a leaf extension that extends circumferentially beyond the main body. The sealing arrangement also includes a second outer seal adjacent to the first outer seal, the second outer seal comprising a main body, a circumferentially oriented frame rail, an axially oriented leaf, a frame rail extension that extends circumferentially beyond the main body, and a leaf extension that extends circumferentially beyond the main body. The second outer seal is circumferentially aligned with the first outer seal. The sealing arrangement also includes a side seal radially disposed between the first outer seal and the second outer seal. The side seal comprising an elongate radially oriented main body, an axially oriented leaf, a projection, and a notch defined by the elongate radially oriented main body, an axial portion of the projection, and a radial portion of the projection.

Another embodiment is directed to a gas turbine. The gas turbine includes a central axis. The central axis of the gas turbine defines an axial direction, a radial direction perpendicular to the central axis, and a circumferential direction extending around the central axis. The gas turbine further comprises a compressor, a turbine comprising a first stage nozzle at an upstream end of the turbine, and a plurality of combustors disposed downstream from the compressor and upstream from the turbine. The combustors are spaced along the circumferential direction. Each combustor includes an upstream end, a downstream end, a transition duct which defines a flow path from the compressor to the turbine, and an aft frame that circumferentially surrounds the downstream end of the transition duct. The aft frame comprising a forward face and an aft face, the aft frame further comprising an inner portion separated from an outer portion along the radial direction, a pair of opposing side portions that extend along the radial direction between the inner portion and the outer portion, a pair of outer corners defined by the intersections of the pair of opposing side portions with the outer portion, and a tab projecting from one of the pair of outer corners. A first outer seal is on the outer portion of the aft frame of the transition duct of a first one of the plurality of combustors, the first outer seal comprising a main body, a circumferentially oriented frame rail, an axially oriented leaf, a frame rail extension that extends circumferentially beyond the main body, and a leaf extension that extends circumferentially beyond the main body. A second outer seal is on the outer portion of the aft frame of the transition duct of a second one of the plurality of combustors, the second combustor circumferentially adjacent to the first combustor, the second outer seal comprising a main body, a circumferentially oriented frame rail, an axially oriented leaf, a frame rail extension that extends circumferentially beyond the main body, and a leaf extension that extends circumferentially beyond the main body. A side seal is radially disposed between the first outer seal and the second outer seal, the side seal comprising an elongate main body defining a height of the side seal along the radial direction, a leaf extending from the main body along the axial direction, a projection, and a notch defined between the elongate main body and the projection.

Those of ordinary skill in the art will better appreciate the features and aspects of such embodiments, and others, upon review of the specification.

BRIEF DESCRIPTION OF THE DRAWINGS

A full and enabling disclosure of the of various embodiments, including the best mode thereof to one skilled in the art, is set forth more particularly in the remainder of the specification, including reference to the accompanying figures, in which.

DETAILED DESCRIPTION

Figure 1:
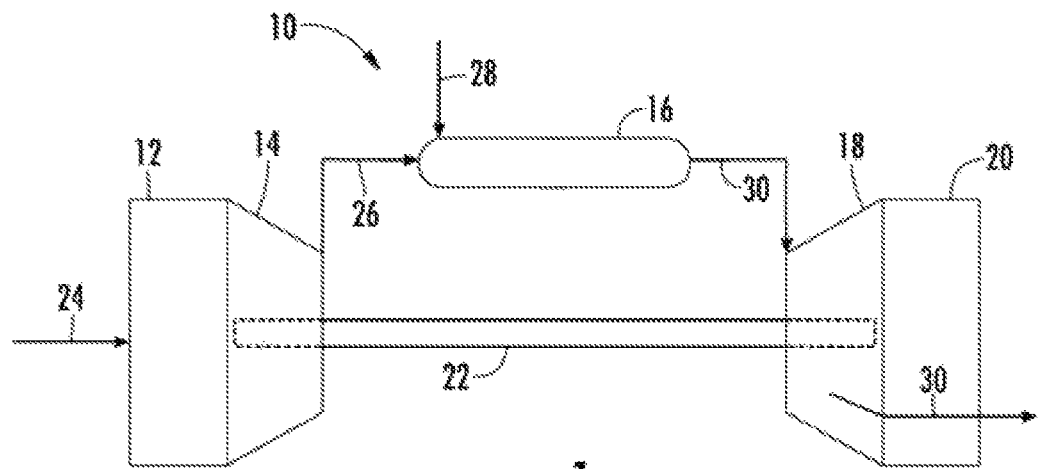
FIG. 1 illustrates a schematic diagram of an exemplary gas turbine that may incorporate various embodiments of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

As used herein, the terms "first," "second," and "third" may be used interchangeably to distinguish one component from another and are not intended to signify location or importance of the individual components. The terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Each example is provided by way of explanation, not limitation. In fact, it will be apparent to those skilled in the art that modifications and variations can be made without departing from the scope or spirit thereof. For instance, features illustrated or described as part of one embodiment may be used on another embodiment to yield a still further embodiment. Thus, it is intended that the present disclosure covers such modifications and variations as come within the scope of the appended claims and their equivalents. Although exemplary embodiments of the present disclosure will be described generally in the context of a land based power generating gas turbine combustor for purposes of illustration, one of ordinary skill in the art will readily appreciate that embodiments of the present disclosure may be applied to any style or type of combustor for a turbomachine and are not limited to combustors or combustion systems for land based power generating gas turbines unless specifically recited in the claims.

Referring now to the drawings, FIG. 1 illustrates a schematic diagram of an exemplary gas turbine 10 that may incorporate various embodiments of the present invention. As shown, the gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. The combustion gases 30 exiting the turbine 18 may then be exhausted from the gas turbine 10 via the exhaust section 20.

Figure 2:
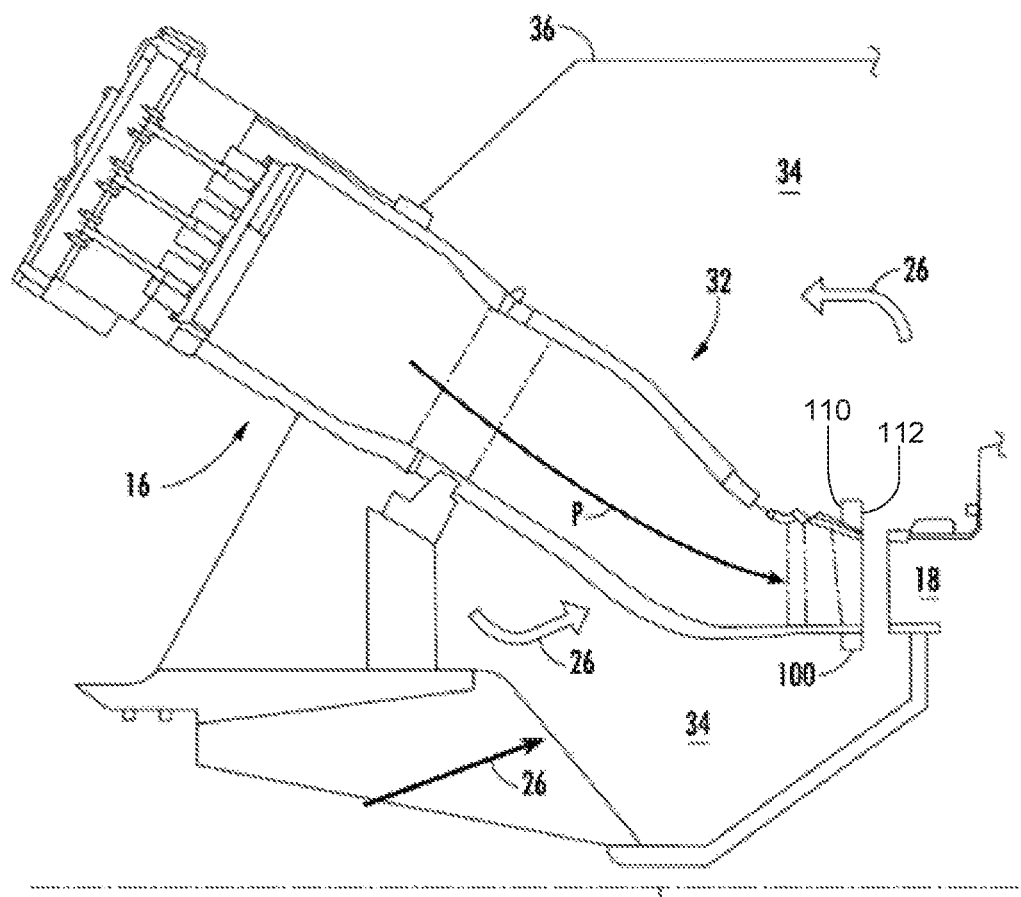
FIG. 2 illustrates a section view of a transition duct between a combustor and an inlet according to at least one embodiment.

As shown in FIG. 2, the combustor 16 may be at least partially surrounded by an outer casing 36 such as a compressor discharge casing. The outer casing 36 may at least partially define a high pressure plenum 34 that at least partially surrounds various components of the combustor 16, such as transition duct 32. The high pressure plenum 34 may be in fluid communication with the compressor 14 (FIG. 1) so as to receive the compressed air 26 therefrom. As illustrated in FIG. 2, the combustor 16 may be connected to the turbine 18 via a transition duct 32 including an aft frame 100. The transition duct 32 defines a flow path P. Also shown in FIG. 2 is the central axis A of turbine 18, which defines an axial direction that is substantially parallel to and/or coaxially aligned with axis A, a radial direction perpendicular to axis A, and a circumferential direction extending around axis A.

Figure 3:
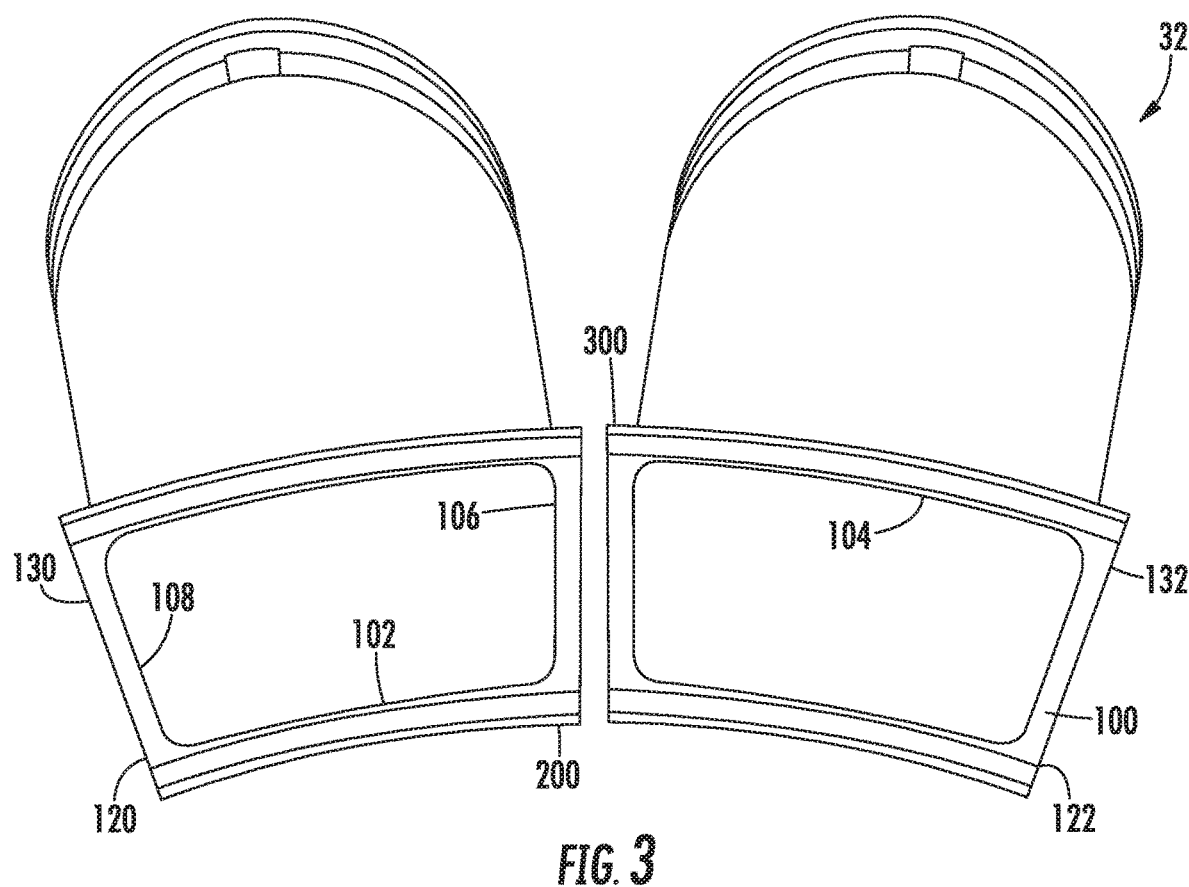
FIG. 3 is a perspective view of circumferentially adjacent aft frames.

Referring now to FIG. 3, a pair of circumferentially arranged transition ducts 32 are illustrated, each having an aft frame 100 that surrounds its respective downstream end. As illustrated in FIG. 3, in some embodiments, the aft frame may have an inner portion 102 and an outer portion 104, with a pair of opposing side portions 106 and 108 that extend radially between the inner and the outer portions 102 and 104. Also illustrated in FIG. 3 is an inner seal 200 and an outer seal 300 respectively disposed on the inner portion 102 and outer portion 104 of each aft frame 100. In the exemplary embodiment illustrated in FIG. 3, inner seal 200 and outer seal 300 are circumferentially oriented, each inner seal 200 is circumferentially aligned with the other inner seal 200 on the adjacent aft frame 100, and each outer seal 300 is circumferentially aligned with the other outer seal 300 on the adjacent aft frame 100. As illustrated in FIGS. 2 through 9, the aft frame 100 may include a forward face 110 and an aft face 112. The intersections of side portions 106 and 108 with inner portion 102 define inner corners 120 and 122, and the intersections of side portions 106 and 108 with outer portion 104 define outer corners 130 and 132. A radially oriented side seal 400 is disposed between the aft frames 100 and the inner and outer seals 200 and 300 disposed thereon. In the description herein, certain features of the aft frame 100 and seals, 200, 300, and 400 will be described with reference to one or both inner corners 120 and 122, nonetheless, it should be recognized by one of ordinary skill in the art that such features can be associated with any or all of inner corners 120, 122 or outer corners 130, 132.

Figure 4:
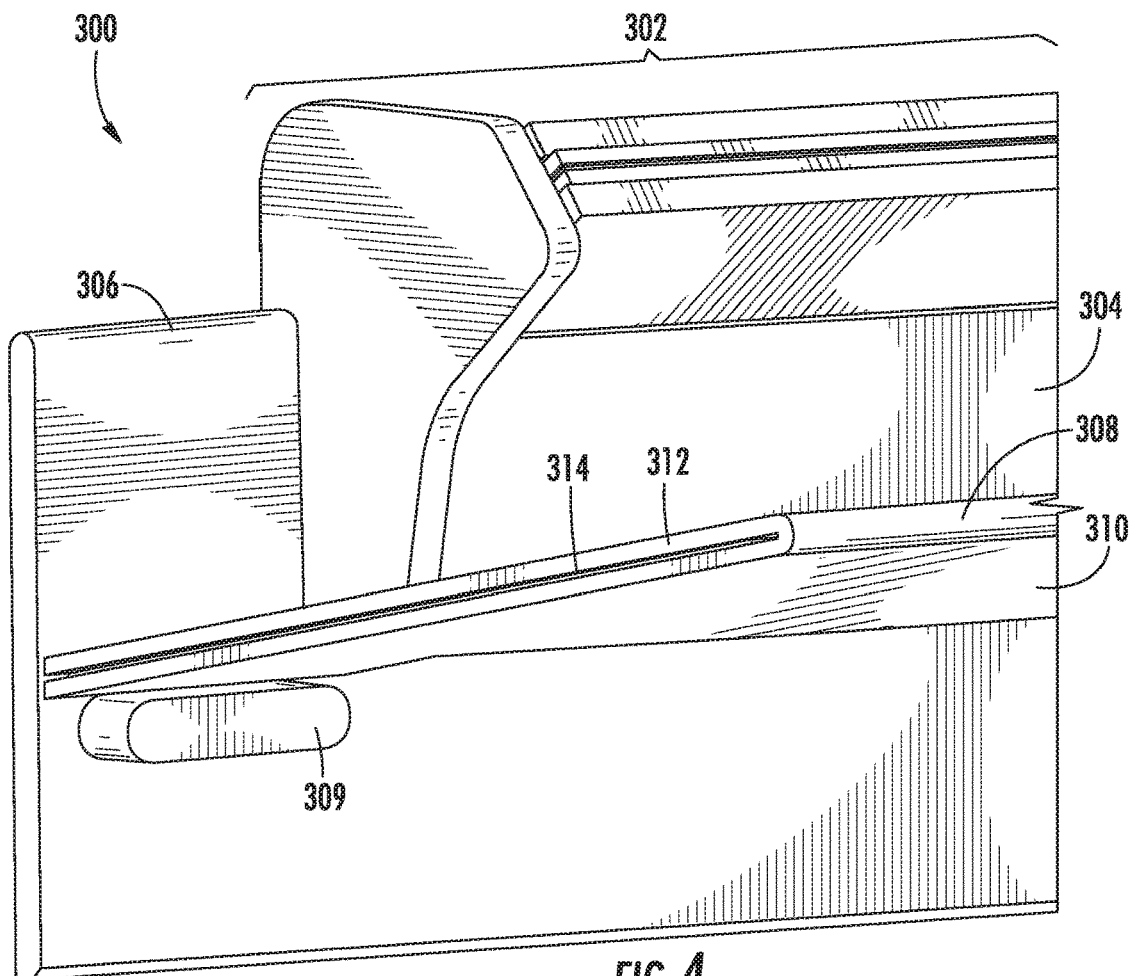
FIG. 4 is a perspective view of an outer seal according to at least one embodiment.

FIG. 4 illustrates an outer seal 300 according to at least one embodiment of the present subject matter. Outer seal 300 may include a main body 302 which is generally circumferentially coextensive with the outer portion 104 of aft frame 100. Main body 302 may include a circumferentially oriented frame rail 304 and an axially oriented leaf 308. As illustrated in FIG. 4, some embodiments of outer seal 300 may further include a frame rail extension 306 that extends circumferentially beyond the main body 302 and a leaf extension 310 that extends circumferentially beyond the main body 302. A deflection limiter 309 may be provided radially inward of leaf extension 310, and in particular a corner extension 307 (FIG. 5) thereof. Deflection limiter 309 reinforces corner extension 307 to avoid or minimize corner extension 307 bending radially inward, away from axial leaf 412 (FIGS. 8 & 9) under pressure from compressed air 26 (FIG. 2).

Figure 5:
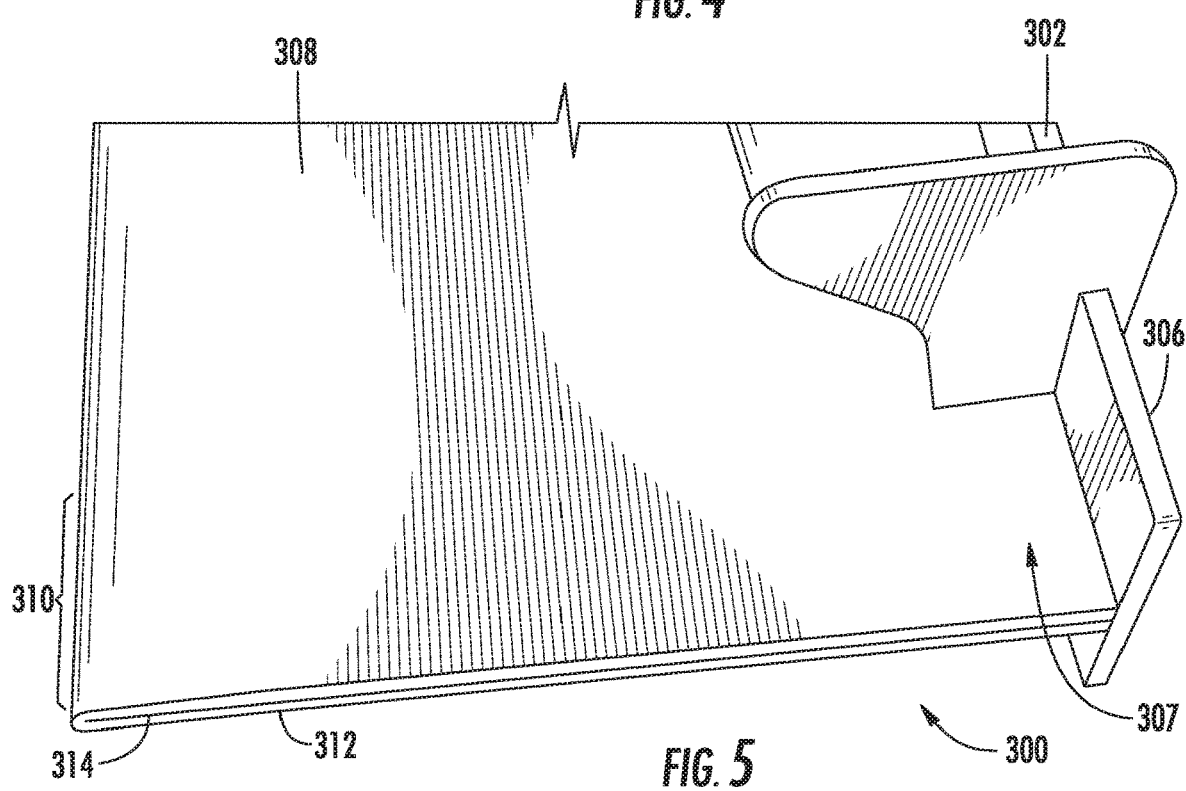
FIG. 5 is a perspective view of an outer seal according to at least one embodiment.

In some embodiments, such as the example illustrated in FIG. 5, outer seal 300 generally comprises primarily a cloth material 312, which can be a woven mesh cloth of a suitable metal material, e.g., alloy L605. The cloth material 312 is supported by frame rail 304 and various shims 314. The cloth material 312 extends generally axially away from the frame rail 304 in the aft direction, such that cloth material 312 and supporting shim 314 form axially oriented leaf 308.

Figure 6:
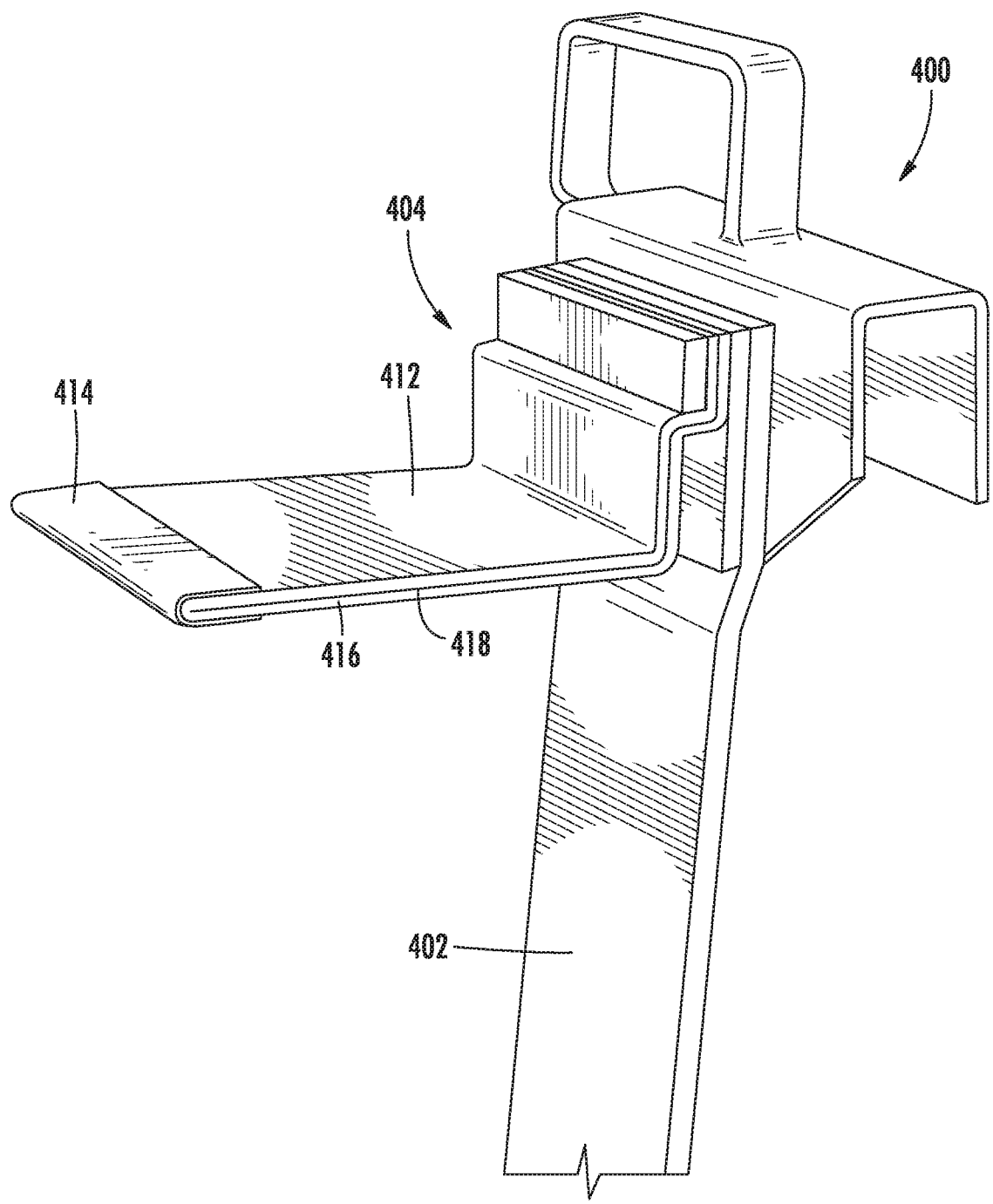
FIG. 6 is a perspective view of a side seal according to at least one embodiment.
Figure 7:
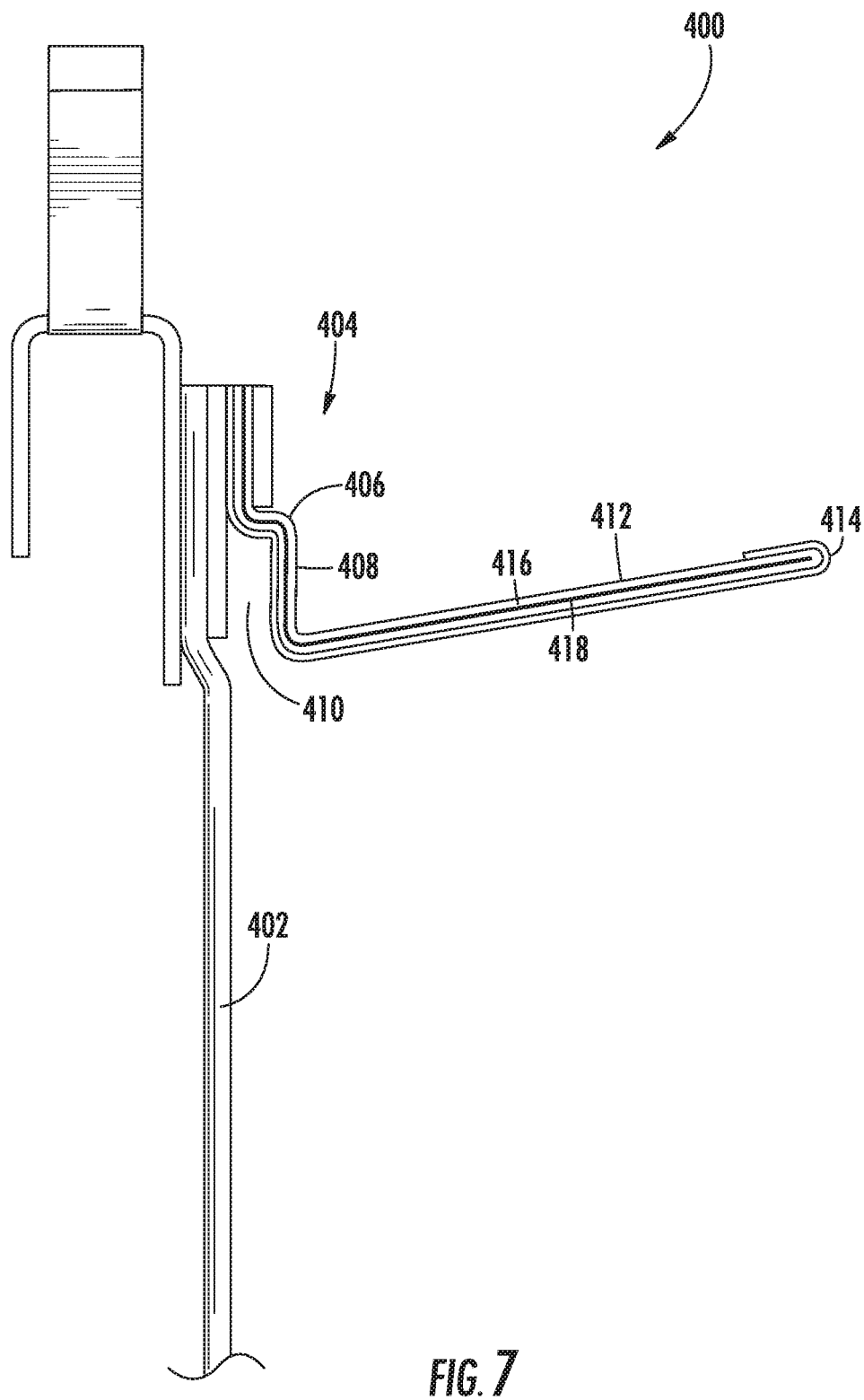
FIG. 7 is a side view of a side seal according to at least one embodiment.

FIGS. 6 and 7 illustrate an exemplary side seal 400 which may be radially disposed between adjacent aft frames 100 (see, e.g., FIG. 3), and in particular the outer seals 300 thereon. In some embodiments, such as those illustrated in FIGS. 6 and 7, the side seal 400 may include an elongate radially oriented main body 402, with a projection 404 extending from the main body 402 on the aft side of main body 402. As illustrated in FIG. 7, projection 404 may in some embodiments include an axial portion 406 and a radial portion 408. Also as shown, e.g., in FIG. 7, a notch 410 may be defined between main body 402 and projection 404, and in particular between main body 402 and the axial portion 406 and the radial portion 408 of projection 404. In some embodiments, such as those illustrated in FIGS. 6 and 7, the side seal 400 may further include an axially oriented leaf 412, and the leaf 412 may extend from the radial portion 408 of the projection 404. Axial leaf 412 may be constructed of a cloth material 416 with supporting shim 418, similar to outer seal 300 as described above. Axial leaf 412 may further include an exterior laminate 414 of similar material as the internal supporting shim 418.

Figure 8:
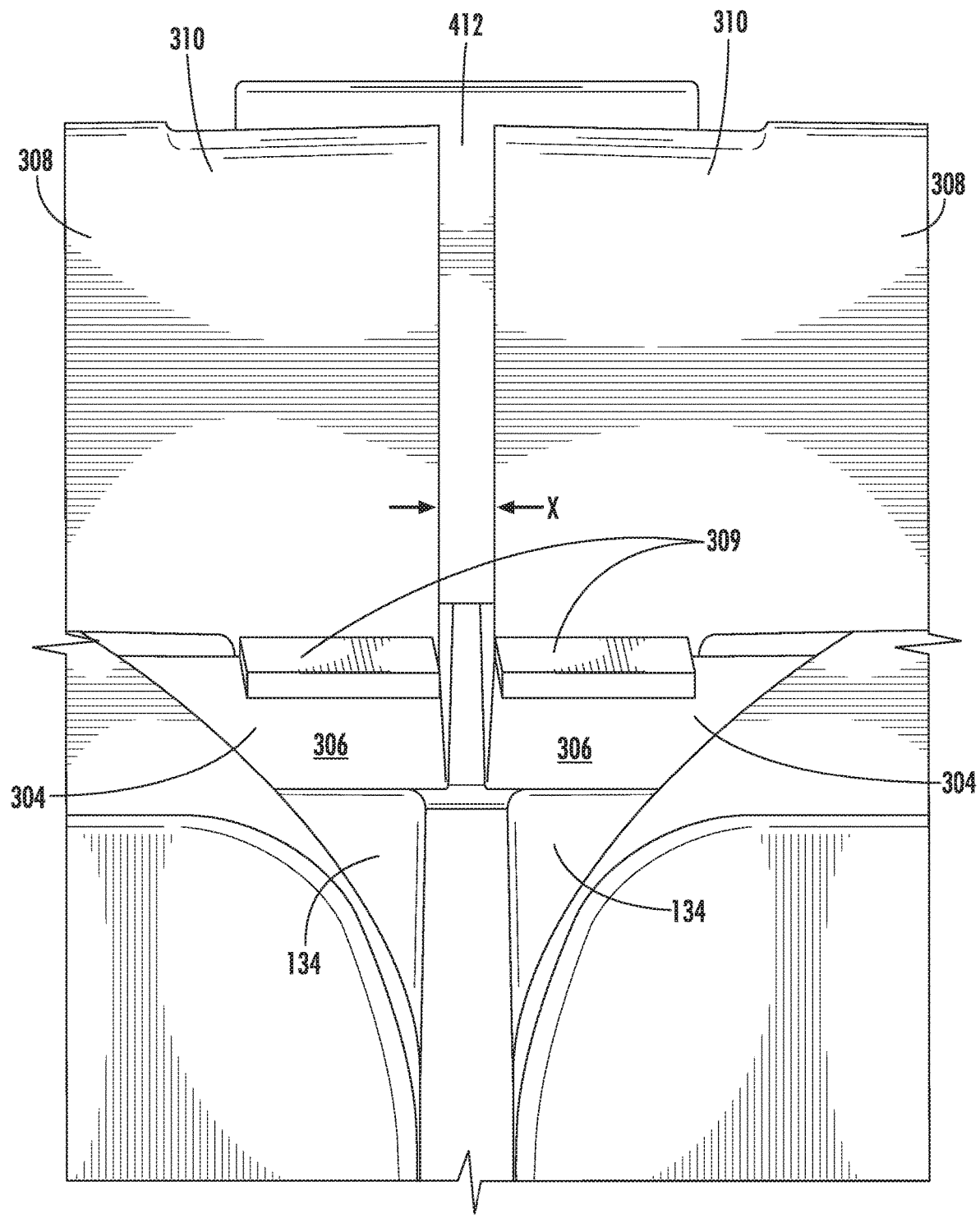
FIG. 8 is a perspective view of an exemplary sealing arrangement according to at least one embodiment.

FIG. 8 illustrates an exemplary sealing arrangement incorporating features of at least one embodiment of the present subject matter. The view of FIG. 8 is looking radially outward, which may more generally be characterized as looking up at the bottom of outer seals 300 and leaf 412 of side seal 400. As illustrated in FIG. 8, one or more of aft frames 100 may include a tab 134 projecting from one or more of outer corners 130, 132. Also illustrated in FIG. 8, a circumferential installation clearance X may be maintained between adjacent outer seals 300. As shown in FIG. 8, when the exemplary sealing arrangement is assembled, tabs 134 abut frame rail extensions 306 to at least partially occlude flow around the outer corners 130, 132. Also shown in FIG. 8, in some exemplary embodiments, the gap arising from circumferential installation clearance X may be at least partially occluded by the overlapping arrangement of axially oriented leaf 412 and leaf extensions 310.

Figure 9:
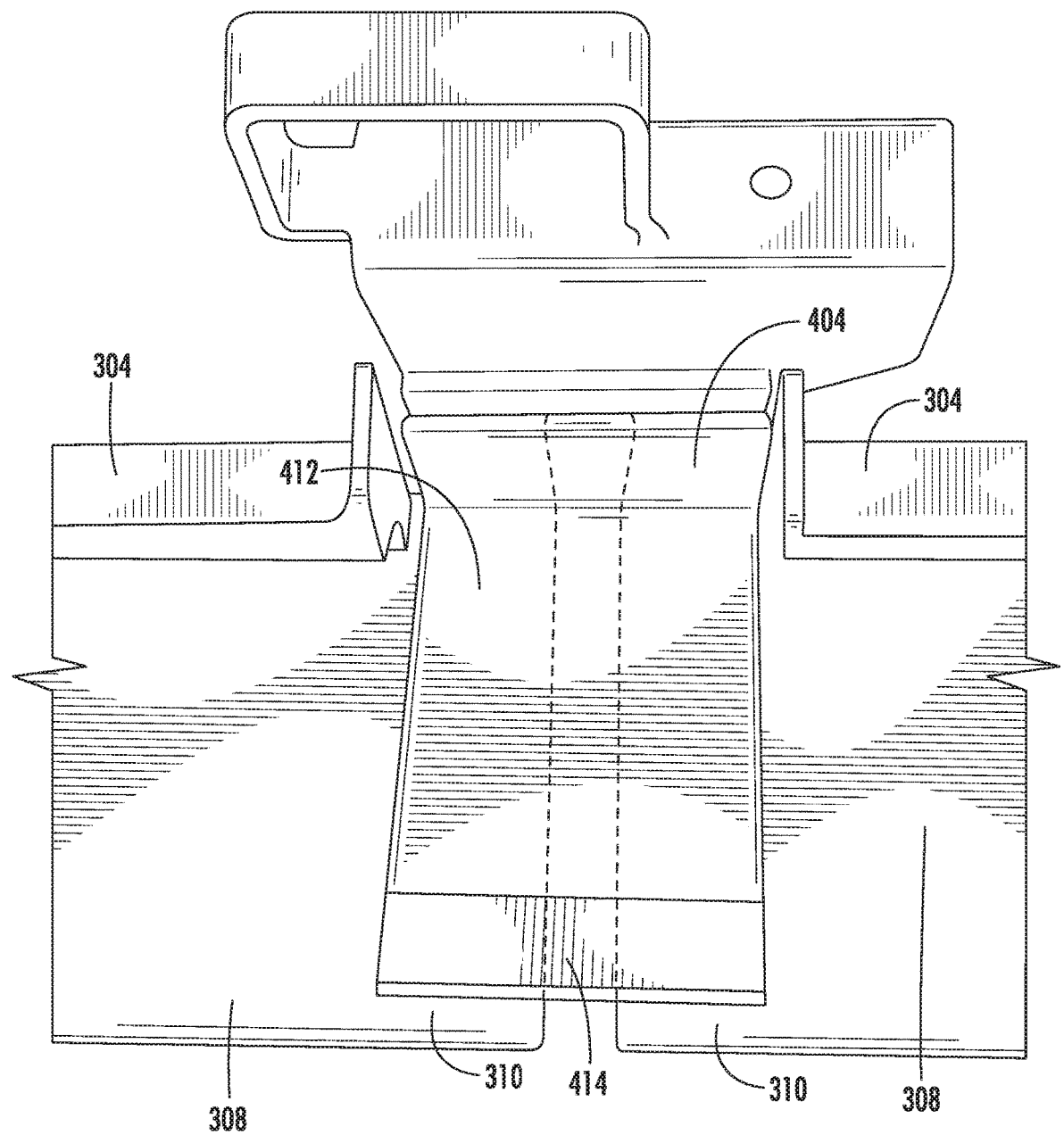
FIG. 9 is a perspective view of an exemplary sealing arrangement according to at least one embodiment.

FIG. 9 illustrates a perspective view of an exemplary sealing arrangement according to at least one embodiment of the present subject matter. The view of FIG. 9 is looking radially inward, which may more generally be characterized as looking down at the top of outer seals 300 and side seal 400. As illustrated in FIG. 9, the adjacent outer seals 300 and side seal 400 cooperate to at least substantially occlude circumferential installation clearance X between adjacent aft frames 100. More particularly, in the example embodiment of FIG. 9, each frame rail extension 306 and each leaf extension 310 extends towards the corresponding frame rail extension 306 and leaf extension 310 on the adjacent outer seal 300. Also illustrated in FIG. 9, in some embodiments, each of the frame rail extensions 306 on adjacent outer seals 300 may be slideably received within the notch 410 in the side seal 400 such that the portion of circumferential installation clearance X between the frame rail extensions 306 is at least substantially occluded. Further, in embodiments wherein the frame rail extensions 306 are slideably received within the notch 410, thermal expansion and contraction, as well as operation vibration, and other relative movement may be accommodated by the slideably nature of this connection Further illustrated for example in FIG. 9, the axially oriented leaf 412 extends from projection 404 such that when the sealing arrangement is assembled the axially oriented leaf 412 of the side seal 400 overlaps the leaf extensions 310 on the adjacent outer seals 300, and at least substantially occludes the portion of circumferential installation clearance X between the adjacent leaf extensions 310.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. For example, the exemplary description in the foregoing pertaining to the inner corners of the aft frame can also be implemented at one or more outer corners of the aft frame as well as or instead of the inner corner(s). Such other examples are intended to be within the scope of the claims if they include structural elements that do not differ from the literal language of the claims, or if they include equivalent structural elements with insubstantial differences from the literal language of the claims.

What is claimed is:

1. A sealing arrangement for sealing between a first component and a second component, comprising:
    a first outer seal comprising a first main body, a first circumferentially oriented frame rail, a first axially oriented leaf, a first frame rail extension that extends circumferentially beyond the first main body, and a first leaf extension that extends circumferentially beyond the first main body;
    a second outer seal adjacent to the first outer seal, the second outer seal comprising a second main body, a second circumferentially oriented frame rail, a second axially oriented leaf, a second frame rail extension that extends circumferentially beyond the second main body, and a second leaf extension that extends circumferentially beyond the second main body, the second outer seal circumferentially aligned with the first outer seal; and
    a side seal radially disposed between the first outer seal and the second outer seal, the side seal comprising an elongate radially oriented main body, a third leaf, a projection, and a notch defined by the elongate radially oriented main body, an axial portion of the projection, and a radial portion of the projection, wherein the third leaf extends from the radial portion of the projection and is entirely axially oriented, wherein the third leaf overlaps the first leaf extension and the second leaf extension.

2. The sealing arrangement of claim 1, wherein the first frame rail extension and the second frame rail extension are adapted to be slideably received within the notch in the side seal.

3. The sealing arrangement of claim 1, wherein the first frame rail extension and the first leaf extension extend towards the second outer seal.

4. The sealing arrangement of claim 3, wherein the second frame rail extension and the second leaf extension extend towards the first outer seal.

5. The sealing arrangement of claim 4, further comprising a circumferential installation clearance between the first outer seal and the second outer seal.

6. The sealing arrangement of claim 1, wherein the elongate radially oriented main body of the side seal defines a first circumferential width, the third leaf defines a second circumferential width, the second circumferential width is the same as or less than the first circumferential width, and the second circumferential width is greater than a circumferential installation clearance between the first outer seal and the second outer seal.

7. The sealing arrangement of claim 1, further comprising a first deflection limiter radially inward of the first leaf extension and a second deflection limiter radially inward of the second leaf extension.

8. A gas turbine, the gas turbine comprising a central axis, the central axis of the gas turbine defines an axial direction, a radial direction perpendicular to the central axis, and a circumferential direction extending around the central axis, the gas turbine further comprising:
    a compressor;
    a turbine comprising a first stage nozzle at an upstream end of the turbine;
    a plurality of combustors disposed downstream from the compressor and upstream from the turbine, the combustors spaced along the circumferential direction, each combustor comprising:
        an upstream end;
        a downstream end;
        a transition duct which defines a flow path from the compressor to the turbine;
        an aft frame that circumferentially surrounds a downstream end of the transition duct, the aft frame comprising a forward face and an aft face, the aft frame further comprising an inner portion separated from an outer portion along the radial direction, a pair of opposing side portions that extend along the radial direction between the inner portion and the outer portion, a pair of outer corners defined by an intersection of the pair of opposing side portions with the outer portion, and a tab projecting from one of the pair of outer corners;
    a first outer seal on the outer portion of the aft frame of the transition duct of a first one of the plurality of combustors, the first outer seal comprising a first main body, a first circumferentially oriented frame rail, a first axially oriented leaf, a first frame rail extension that extends circumferentially beyond the first main body, and a first leaf extension that extends circumferentially beyond the first main body;
    a second outer seal on the outer portion of the aft frame of the transition duct of a second one of the plurality of combustors, the second combustor circumferentially adjacent to the first combustor, the second outer seal comprising a second main body, a second circumferentially oriented frame rail, a second axially oriented leaf, a second frame rail extension that extends circumferentially beyond the second main body, and a second leaf extension that extends circumferentially beyond the second main body;
    a side seal radially disposed between the first outer seal and the second outer seal, the side seal comprising an elongate main body defining a height of the side seal along the radial direction, a third leaf extending from the elongate main body, a projection, and a notch defined between the elongate main body, an axial portion of the projection, and a radial portion of the projection, wherein the third leaf extends from the radial portion of the projection and is entirely axially oriented, wherein the third leaf overlaps the first leaf extension and the second leaf extension.

9. The gas turbine of claim 8, wherein the first frame rail extension and the second frame rail extension are adapted to be slideably received within the notch in the side seal.

10. The gas turbine of claim 8, wherein the aft frame tab defines a height along the radial direction and a width along the circumferential direction.

11. The gas turbine of claim 10, wherein the first frame rail extension defines a width along the circumferential direction, the first leaf extension defines a width along the circumferential direction, and the width of the aft frame tab is substantially equivalent to the width of the first frame rail extension and the first leaf extension.

12. The gas turbine of claim 8, wherein the third leaf extends entirely along the axial direction from the side seal projection towards the first stage nozzle.

13. The gas turbine of claim 8, wherein the first frame rail extension and the first leaf extension extend towards the second outer seal.

14. The gas turbine of claim 13, wherein the second frame rail extension and the second leaf extension extend towards the first outer seal.

15. The gas turbine of claim 14, further comprising a circumferential installation clearance between the first outer seal and the second outer seal.

16. The gas turbine of claim 8, wherein the elongate main body of the side seal defines a first width along the circumferential direction, the third leaf defines a second width along the circumferential direction, the second width is the same as or less than the first width, and the second width is greater than a circumferential installation clearance between the first outer seal and the second outer seal.

17. The gas turbine of claim 8, further comprising a first deflection limiter radially inward of the first leaf extension and a second deflection limiter radially inward of the second leaf extension.

* * * * *